United States Patent [19]

Miller

[11] 3,909,543

[45] Sept. 30, 1975

[54] DISCONNECTOR CIRCUIT ARRANGEMENT

[75] Inventor: Harlan E. Miller, Old San Juan, P.R.

[73] Assignee: International Telephone and Telegraph Corporation, Nutley, N.J.

[22] Filed: Jan. 17, 1974

[21] Appl. No.: 434,328

[52] U.S. Cl. .......................... 179/18 B; 179/27 FG

[51] Int. Cl.$^2$ .......................................... H04M 3/42

[58] Field of Search .......... 179/27 FG, 18 B, 27 FH, 179/18 BE, 27 CB, 6 C, 91 R, 96

[56] References Cited

UNITED STATES PATENTS

| | | | |
|---|---|---|---|
| 2,426,210 | 8/1947 | Hatton | 179/27 FG |
| 2,871,300 | 1/1959 | Horwitz et al. | 179/27 FG |
| 2,876,291 | 3/1959 | Barker | 179/27 FG |
| 3,403,230 | 9/1968 | Breed et al. | 179/27 FG |

*Primary Examiner*—Kathleen H. Claffy
*Assistant Examiner*—Joseph Popek
*Attorney, Agent, or Firm*—John T. O'Halloran; Menotti J. Lombardi, Jr.

[57] ABSTRACT

A disconnector circuit arrangement for application on the main distributing frame of the central office telephone equipment, a subscriber is cut off from the central office and coupled instead to a recorded message. Any incoming calls attempting connection with such an out-of-service subscriber are answered instead by having the calling party coupled to a second recorded message. The circuit will cut off one phone on a party line and leave the others unaffected. The connection to the main distributing frame may be realized by a plug-jack arrangement.

5 Claims, 2 Drawing Figures

DISCONNECTOR CIRCUIT ARRANGEMENT

CROSS-REFERENCE TO RELATED APPLICATION

This application is related to application Ser. No. 307,908, filed Nov. 20, 1972, now U.S. Pat. No. 3,842,212, and entitled "Recorded Announcement System". The inventor and assignee of the referenced application are the same as this application. Insofar as the referenced application is required for an understanding and to enable practicing the invention of this application, it is hereby incorporated by reference.

BACKGROUND OF THE INVENTION

This invention relates to a system that gives a recorded announcement to a telephone, which has been temporarily disconnected at the telephone central office. According to the reference application, the system gives a recorded message to persons calling a phone that has been disconnected and to the disconnected phone. The system provides recorders to inform both incoming callers and the disconnected subscriber. Where the disconnected subscriber is out of service, as usually is the case for non-payment, the recorder will so indicate to him. However, the message to the calling subscriber will only inform him that the line is temporarily out of service.

The present invention advances this system by providing means for disconnecting only one party without affecting the other parties on multi-party lines. A disconnector circuit arrangement is provided for application on the central office main distributing frame (MDF).

SUMMARY OF THE INVENTION

It is therefore an object of this invention to provide a disconnector arrangement for a system providing recorded messages to the calling party and the out-of-service subscriber, informing each as to the existence of subscriber disability on a selective party basis.

According to the broader aspects of the invention, the system for connecting recorded messages to multi-party telephone subscriber's lines for application on the main distributing frame of the central office telephone equipments includes a disconnector circuit arrangement having means for separating (isolating) subscriber's lines from the central office equipment, and means for coupling the subscriber's lines to the recorded distribution system and for connecting to the subscriber a recorded message defining the nature of the out-of-service condition; and means is also provided for answering incoming calls to the out-of-service subscriber and coupling a calling subscriber to a separate recorded message from the recorder distribution system to inform the calling subscriber of the out-of-service status, and for detecting the party which is to be denied services to affect the selected disconnection.

The invention provides means to separate the disconnected subscriber's line from central office equipment, to connect the disconnected subscriber to a recorded announcement, to answer the incoming call and connect it to a different recorded announcement, and to detect one subscriber to be disconnected and ignore the other subscriber or subscribers.

A feature of the invention is that it may be realized by a plug or isolator arrangement containing circuitry for disconnecting the station phone, for coupling to the recorders, and for answering the incoming calls at the MDF. According to the referenced application, the disconnector circuit arrangement is designed to be directly operable with existing isolation jacks and recorder distribution jacks. Another feature is that this invention can be used with any type of central office which uses cross-connection wires to connect the subscriber's telephone to the central office.

BRIEF DESCRIPTION OF THE DRAWINGS

The above-mentioned and other objects and features of this invention will become more apparent and the invention itself will be best understood by reference to the following description taken in conjunction with the accompanying drawings, in which.

DESCRIPTION OF THE PREFERRED EMBODIMENT

Figure 1:
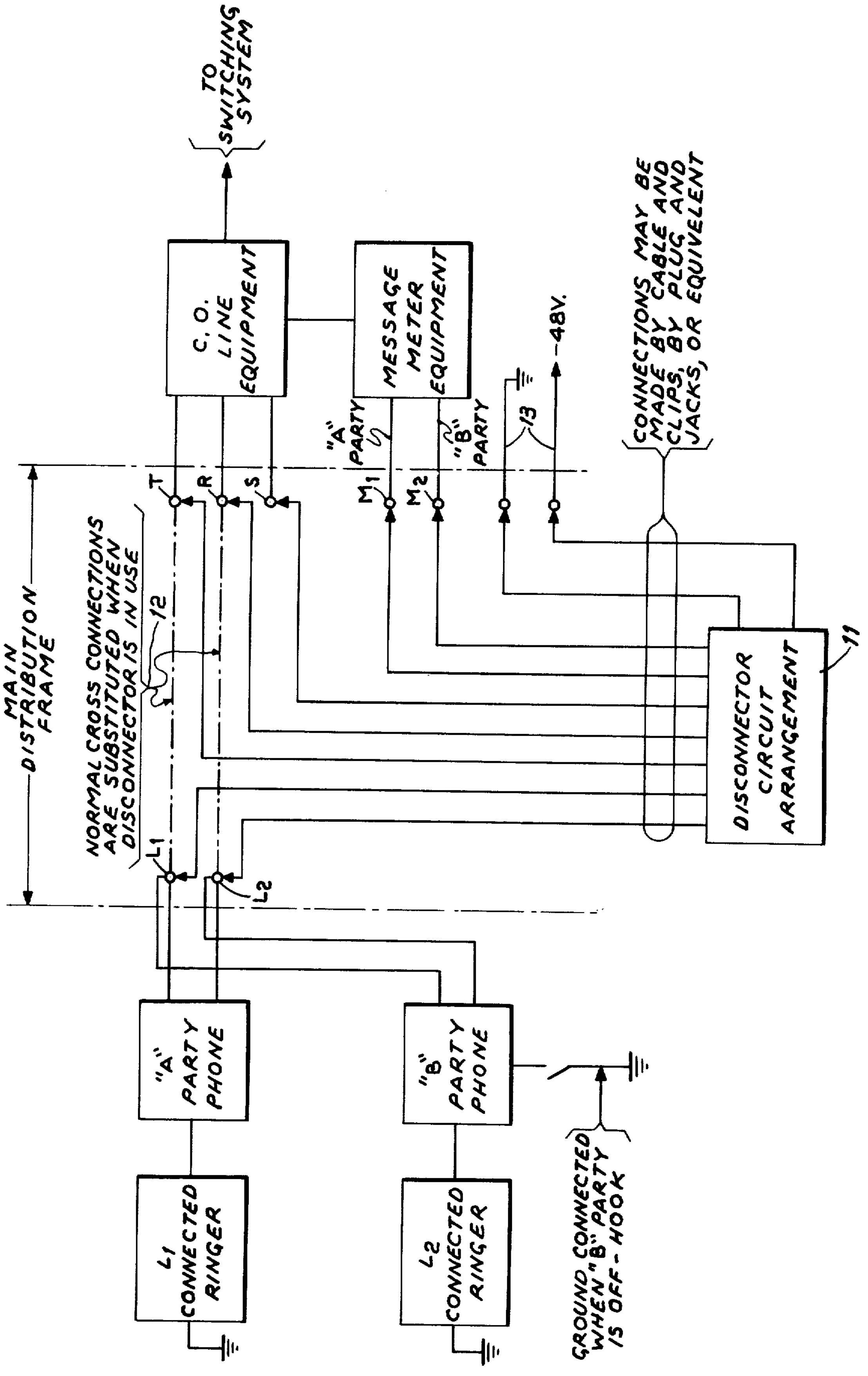
FIG. 1 shows a typical two party line system with the circuit disconnector arrangement connected in place of the normal connection in the MDF.

Referring now to FIG. 1, a typical two party line sysstem with the disconnector circuit arrangement 11 is connected in place of the normal cross connection wires 12. The signals that indicate which party is making a call occur at "M1" or "M2" on the MDF. The signals that indicate which party is receiving a call occur at "T" and "R". The 48 volt battery and ground for the arrangement are provided by leads 13.

Typically in the system a caller will ring "A" party via T to "L1", and the "B" party via R to "L2". When the A party places a call, a ground potential will appear at M1, and conversely when B party makes a call, a ground potential will appear at M2. These signals, or their equivalents, are required for the initial operation of the disconnector circuit arrangement. The S line also provides ground potential for the disconnector circuit in the held operated function as long as the calling party holds the connection. The battery and ground potentials are required for power in the disconnector held operated function as long as the desired phone is off-hook, since M1 or M2 do not remain grounded when the selected party is disconnected by the disconnected circuit arrangement. Although the battery and ground potentials are shown separately, they may also be derived from T and R if desired.

Figure 2:
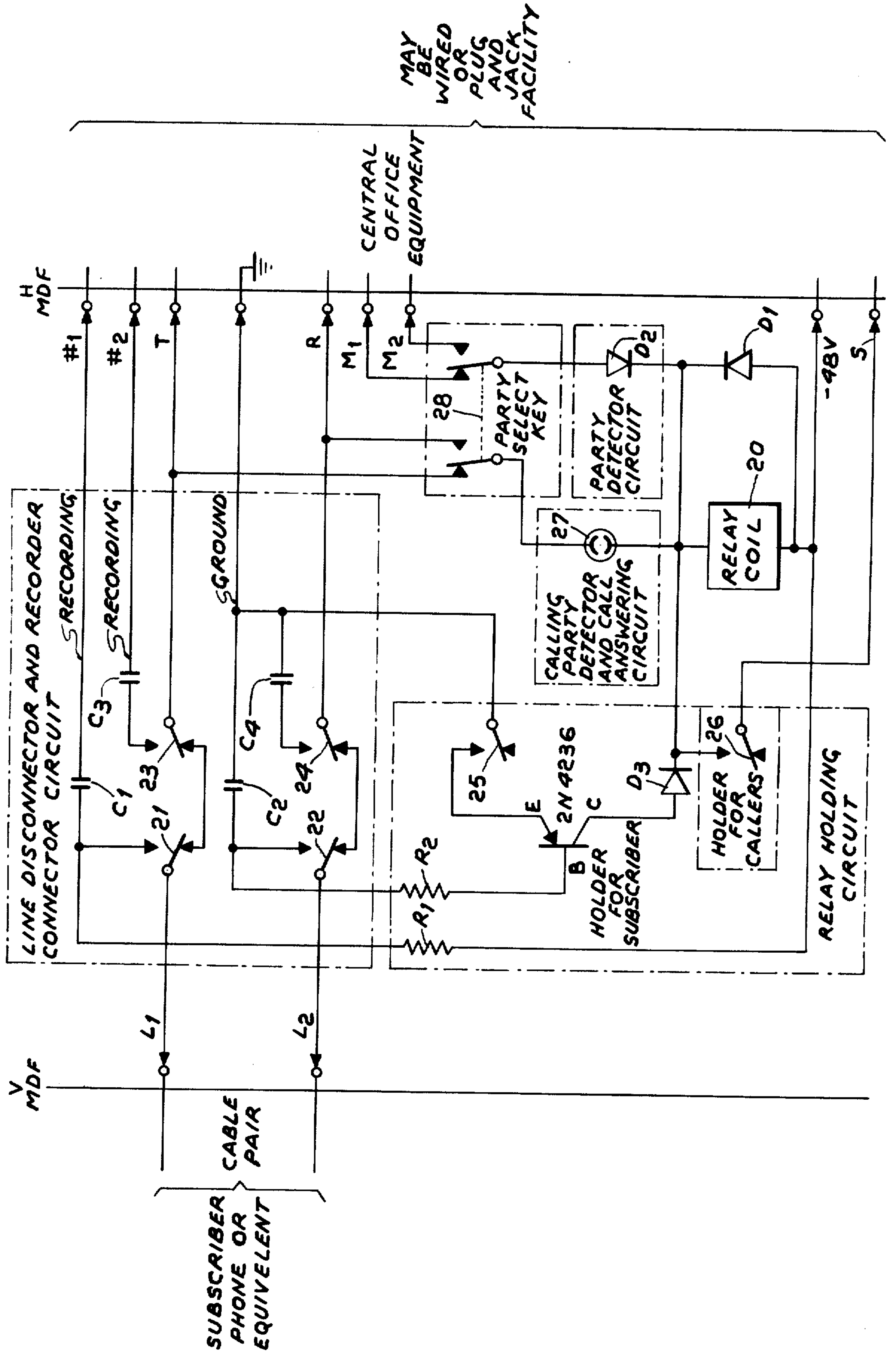
FIG. 2 shows the disconnector circuit arrangement according to the invention.

Referring now to FIG. 2, the disconnector circuit arrangement is shown in a detailed embodiment. The arrangement includes a relay 20 with contacts 21 to 26, three diodes D1 to D3, four capacitors C1 to C4, a neon lamp 27, to gate switch select key 28, and resistors R1, R2.

According to the method of operation of the arrangement of FIG. 2, when one subscriber on a party line attemps to place a call, this closes a circuit between L1 and L2 which causes the line circuit to operate in the central office. The circuit path as shown through the disconnector circuit arrangement is as follows: terminal T, contact 23, contact 21, L1, through subscriber phone, L2, contact 22, contact 24, and terminal R. Terminals T and R are connected to the central office line equipment when the line equipment operates, i.e., M1 or M2 will be grounded. This of course depends on which party places the call. Assume M1 or A party for the illustrated case. In this case the Select Key 20 is manually operated and in the position shown so that the M1 or A party will not be allowed to make a call. The operation is as follows: A ground is placed on M1 lead, through the made contact of select key 28 through diode D2, relay coil 20, to —48V battery. The relay 20 will operate and its contacts 21 to 26 will move from the unoperated position shown to the opposite operated position. Diode D1 connected across the relay is the control voltage peaks when the relay is deenergized.

The operation of relay 20 disconnects the selected phone from the central office line equipment and switches it to the transistor circuit which holds the relay operated as long as the selected phone is off-hook. The operation of the holding circuit portion is as follows: the ground connection is coupled through made contact 25, to E of the transistors; the —48V is coupled through relay coil 20, through diode D3 (which prevents voltage polarity change surges from reaching and destroying the transistor), and to C of the transistor (2N4236) and the —48V through R1, through made contact 21, through L1, through selected phone, through L2 to B of transistor which is now conducting and will hold the relay 20 operated as long as the phone is off-hook.

When the relay is operated it also connects a recorded announcement to the telephone. This announcement will inform the customer that he has been disconnected for non-payment or other reasons. The recorded announcement is connected at terminal No. 1 H of the MDF, through C1, through operated contact 21, through L1, through selected phone, through L2, through operated contact 22, through C2 to ground.

The disconnector circuit arrangement will also prevent calls from reaching the selected telephone that is being denied service. The ringing voltage, 110 to 130 volts AC, is applied to T or R lead (for two party service) depending on which party is being called. In the assumed case, the A party connected to the T lead is to be denied service. The ringing voltage on T passes through the contact of the party select key 28, which was placed in the show position, through the detecting lamp 27, through relay coil 20, to —48V, through C.O. battery to ground and return to ringing source (one side of ringing source must be grounded).

With relay 20 operated the contacts 21 to 26 move from the shown unoperated position to opposite operated position, the neon lamp 27 is connected to ground S through contact 26, since S is normally grounded when the Central Offices switches a call to this line. In this condition the NE2H neon lamp 27 conducts and simulates an answered call. This causes the central office to cut-off the ringing voltage and switches through the calling party. The relay 20 remains operated by the —48V connection through relay coil 20, and through contact 26 to S ground. The relay contacts will now remain operated until the caller hangs up.

When the relay 20 is operated the caller will be connected to a recorded announcement. This may be the same or a different recording from that given to the disconnected phone. The circuit path from the continuous recording is through terminal No. 2 of H MDF, through C3, through contact 23, to T, through calling phone, to R, through contact 24, through C4 to ground.

It should be understood that with this system the other party will hear the message if they should pick up the phone after the party to be denied service has picked up the phone. This is normal on party lines and can't be prevented except if line guards are used to prevent party lines from interfering with each other.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A disconnector circuit arrangement for use on the central office main distributing frame to selectively disconnect one subscriber in a party line from the central office equipment and couple said one subscriber to a recording means, comprising:

means to select the one subscriber to be placed in an out-of-service condition;

a diode detector means coupled to said select means to detect the one subscriber attempting connection through the central office main distributing frame;

a relay arrangement coupled to said select and detector means and having first means for separating the one subscriber from the central office equipment and second means for simultaneously coupling the one subscriber to a recorded message indicating the out-of-service status, said arrangement including a transistor for holding said one subscriber disconnected and connected to said recorded message as long as said subscriber is off-hook, said transistor coupled in the emitter ground configuration and between said one subscriber and the relay coil of said relay arrangement; and said relay arrangement including a neon lamp which conducts in response to incoming calls to said one subscriber to enable coupling of the incoming call to another recorded message indicating the out-of-service condition of the one subscriber.

2. A disconnector circuit arrangement for use with a plug-jack arrangement on the central office main distributing frame to disconnect one subscriber of a party line from the switching system of the office and connect the one subscriber to a recorded message, the arrangement comprising in combination:

a party select key to select the one subscriber to be placed in an out-of-service condition;

a party detector means coupled to said select key;

a caller detector and answering means coupled to said select key;

a relay coil responsive to said party and caller means;

a line disconnector and recorder connector circuit containing a plurality of contacts activated by said relay coil to switch said one subscriber to a first recorded message and said caller to a second recorded message when said coil is energized by either said party means or said caller means; and a relay holding circuit coupled between said relay coil and said line disconnector and recorder connector circuit for holding said relay coil energized for time determined by said one subscriber and said caller, said holding circuit includes a transistor and a pair of additional contacts activated by said coil, said transistor and one of said pairs of contacts enabling said relay coil to remain energized as long as said one subscriber is off-hook, and said other of said pair of contacts enabling said coil to remain energized as long as said caller is connected to said second recorded message.

3. The combination of claim 2 wherein said caller detector and answering means includes a neon lamp which conducts to simulate an answered call.

4. The combination of claim 2 wherein said party detector means is a diode.

5. The combination of claim 2 including a relay diode bridging said relay coil to control voltage peaks when the relay coil is de-energized.

* * * * *